(12) United States Patent
Kralick

(10) Patent No.: US 7,094,486 B2
(45) Date of Patent: Aug. 22, 2006

(54) PURGE SYSTEM FOR A FUEL CELL ENCLOSURE

(75) Inventor: James Kralick, Albany, NY (US)

(73) Assignee: Delphi Technologies, Inc., Troy, MI (US)

( * ) Notice: Subject to any disclaimer, the term of this patent is extended or adjusted under 35 U.S.C. 154(b) by 524 days.

(21) Appl. No.: 10/429,378

(22) Filed: May 5, 2003

(65) Prior Publication Data

US 2004/0224197 A1 Nov. 11, 2004

(51) Int. Cl.
*H01M 8/04* (2006.01)
(52) U.S. Cl. .......................... 429/13; 429/19; 429/22; 429/34
(58) Field of Classification Search ...................... None
See application file for complete search history.

(56) References Cited

U.S. PATENT DOCUMENTS 5,980,726 A * 11/1999 Moulthrop et al. ......... 205/637
6,455,183 B1 * 9/2002 Reiser et al. ................. 429/34
6,787,263 B1 * 9/2004 Walsh et al. ................. 429/34

* cited by examiner

*Primary Examiner*—Michael Barr
*Assistant Examiner*—Karie O'Neill
(74) *Attorney, Agent, or Firm*—Paul L. Marshall

(57) ABSTRACT

A fuel cell air supply system disposed in an enclosure. A blower discharge plenum for supplying air individually to various fuel cell functions via individual control valves is provided with an additional controllable purge valve connected to an exhaust port through a wall of the enclosure. At any desired time, the purge valve may be opened and the system process valves closed to draw fresh air into the enclosure and thereby purge stale gases within the enclosure to the exterior of the system. This function is especially useful just prior to start-up of the fuel cells of the system, and may also be used periodically after shut-down to maintain a desirably low temperature in the enclosure during cooling off of the fuel cell assembly.

6 Claims, 4 Drawing Sheets

PURGE SYSTEM FOR A FUEL CELL ENCLOSURE

TECHNICAL FIELD

The present invention relates to fuel cells; more particularly, to enclosures for environmentally isolating fuel cells; and most particularly, to a system for purging the atmosphere in an environmental enclosure.

BACKGROUND OF THE INVENTION

Fuel cells which generate electric current by controllably combining elemental hydrogen and oxygen are well known. In one form of such a fuel cell, an anodic layer and a cathodic layer are separated by a permeable electrolyte formed of a ceramic solid oxide. Such a fuel cell is known in the art as a "solid-oxide fuel cell" (SOFC). Hydrogen, either pure or reformed from hydrocarbons, is flowed along the outer surface of the anode and diffuses into the anode. Oxygen, typically from air, is flowed along the outer surface of the cathode and diffuses into the cathode. Each $O_2$ molecule is split and reduced to two $O^{-2}$ ions catalytically by the cathode. The oxygen ions diffuse through the electrolyte and combine at the anode/electrolyte interface with four hydrogen ions to form two molecules of water. The anode and the cathode are connected externally through the load to complete the circuit whereby four electrons are transferred from the anode to the cathode. When hydrogen is derived by "reforming" hydrocarbons such as gasoline in the presence of limited oxygen, the "reformate" gas includes CO which is converted to $CO_2$ at the anode. Reformed gasoline is a commonly used fuel in automotive fuel cell applications.

A complete SOFC system typically includes auxiliary subsystems for, among other requirements, generating fuel by reforming hydrocarbons; tempering the reformate fuel and air entering the stack; providing air to the hydrocarbon reformer; providing air to the cathodes for reaction with hydrogen in the fuel cell stack; providing air for cooling the fuel cell stack; providing combustion air to an afterburner for unspent fuel exiting the stack; and providing cooling air to the afterburner and the stack.

An enclosure for an SOFC system has two basic functions. The first function is to provide thermal insulation for some of the components which must function at an elevated temperature (700° C.–900° C.) to maintain them at that temperature for efficient operation, to protect lower temperature components outside the thermal enclosure, and to reduce the exterior temperature over the overall unit to a human-safe level. The second function is to provide structural support for mounting of individual components, mounting the system to another structure such as a vehicle, protection of the internal components from the exterior environment, and protection of the surrounding environment from the high temperatures of the fuel cell assembly.

In a solid-oxide fuel cell system, the "hot" components, e.g., the fuel cell stacks, the fuel reformer, tail gas combuster, heat exchangers, and fuel/air manifold, are contained in a "hot zone" within the thermal enclosure. The thermal enclosure is intended specifically for minimizing heat transfer to its exterior and has no significant structural or protective function for its contents. A separate and larger structural enclosure surrounds the thermal enclosure, defining a "cool zone" outside the thermal enclosure for incorporation of "cool" components, e.g., the air supply system and the electronic control system. The structural enclosure components are known in the art as a "plant support module" (PSM).

Process air entering the blower fan in the PSM first enters the enclosure generally through a filter and then is drawn into the blower, passing as cooling air around the electronics process control module (ECM) and the blower motor. The air cools these components and is desirably warmed thereby before being directed to the fuel cell reformer and stacks via a manifold or plenum having a plurality of independently-controllable air valves for metering air as needed to a plurality of process locations and functions. Thus, the PSM is constantly purged through the downstream processes.

When the fuel cell system is shut down, the enclosure may accumulate harmful gases which then are collected by the blower and discharged through the fuel cell system during the next startup, which discharge may be damaging to the fuel cells.

What is needed is means for preventing the discharge of gases in the PSM enclosure into the fuel cell system immediately upon startup thereof.

It is a principal object of the present invention to reduce the risk of damage to a fuel cell system from harmful gases at start-up.

It is a further object of the invention to increase the reliability and safety of operation of such a fuel cell system.

SUMMARY OF THE INVENTION

Briefly described, a blower discharge plenum in a plant support module disposed in an enclosure for a fuel cell system is provided with an additional controlled purge valve connected to an exhaust port through a wall of the enclosure. At any desired time, the purge valve is opened and the system process valves are closed for a predetermined length of time, thus drawing fresh air into the enclosure and purging stale gases within the enclosure to the exterior of the system. This function is especially useful just prior to start-up of the fuel cells of the system, and may also be used periodically after shut-down to maintain a desirably low temperature in the PSM enclosure during cooling off of the fuel cells.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
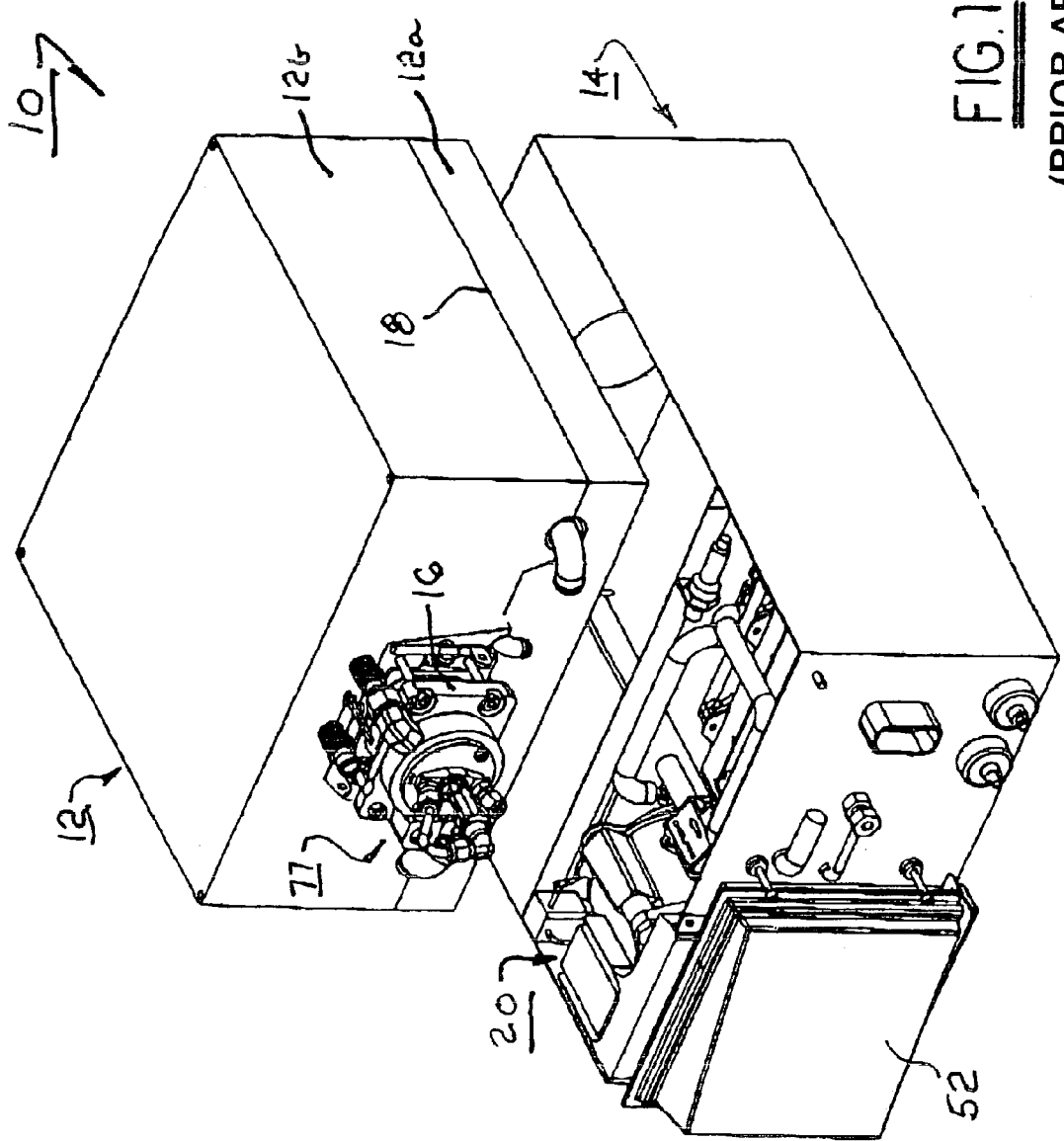
FIG. 1 is an isometric view, partially exploded, of a prior art fuel cell system, showing a hot-zone fuel cell assembly in a thermal enclosure and a cool-zone PSM within a system structural enclosure.

Referring to FIG. 1, a prior art fuel cell system 10 comprises two nested enclosures: a thermal enclosure 12 and a structural enclosure 14. Fuel cell assembly 16 is first disposed in thermal enclosure 12, comprising a bottom portion 12a and a top portion 12b, which in turn is disposed in structural enclosure 14. The split line 18 between bottom portion 12a and top portion 12b is easily arranged such that all pipes, manifolds, shafts, power leads, etc., which need to pass between a "hot zone" in thermal enclosure 12 and a "cool zone" within structural enclosure 14, do so in the middle of split line 18. This provides for easy assembly of the hot components into the thermal enclosure. Thermal enclosure 12 may be formed of any suitable high-temperature high-efficiency insulating material, as is known in the insulating art, and may be a composite including a light-weight metal case. Structural enclosure 14 preferably is fabricated from thicker metal, for example, to provide structural strength and a simple shape, such as a box with a removable lid, for ease of fabrication. An air supply and control assembly 20 is connected to elements of fuel cell assembly 16 projecting through split line 18.

A detailed description of the operation of a fuel cell system is disclosed in U.S. patent application Ser. No. 10/178,823, assigned to the same assignee as the assignee of the present invention, and is incorporated herein by reference.

Figure 2:
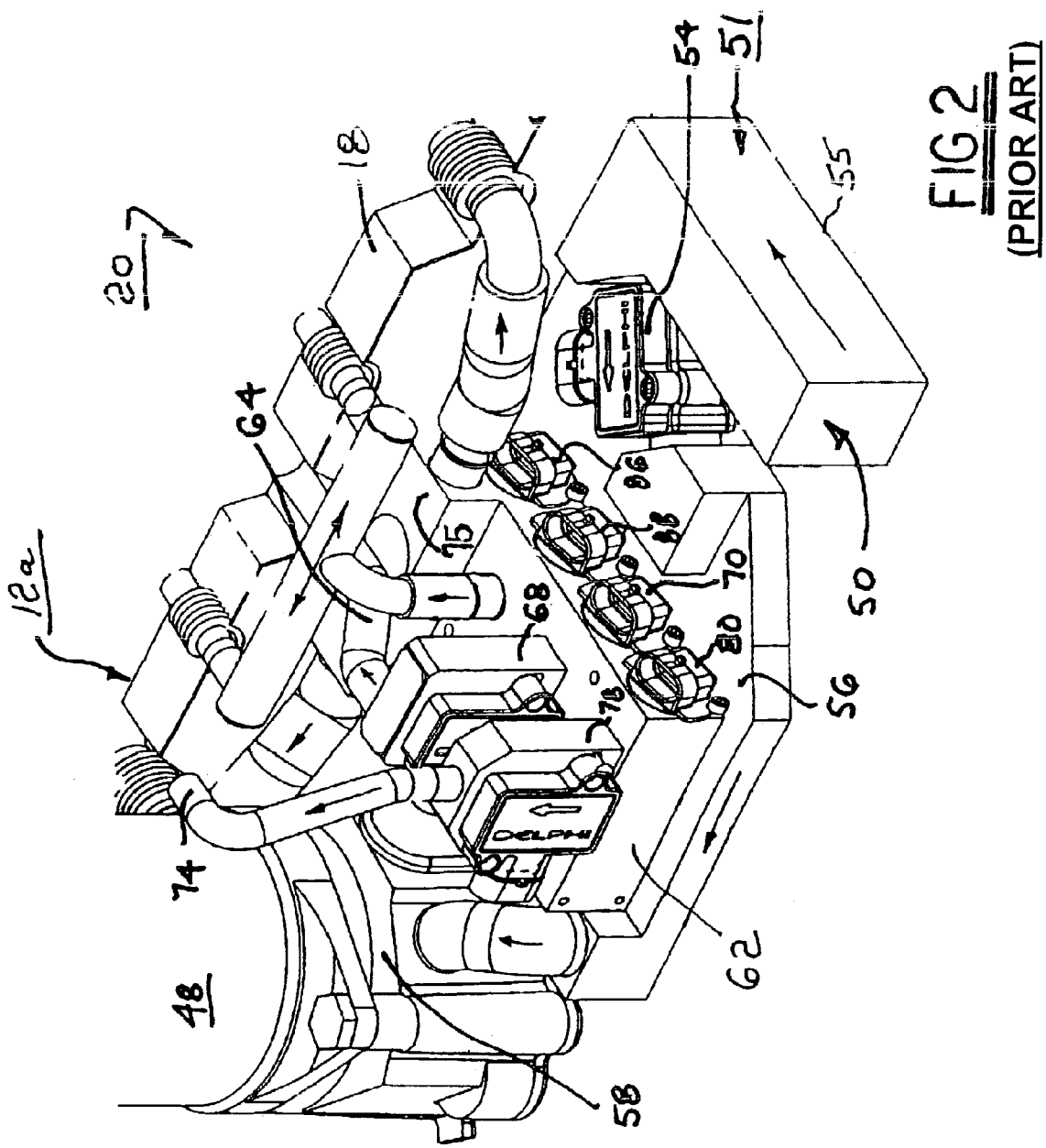
FIG. 2 is an isometric view of the prior art cool-zone PSM shown in FIG. 1.
Figure 3:
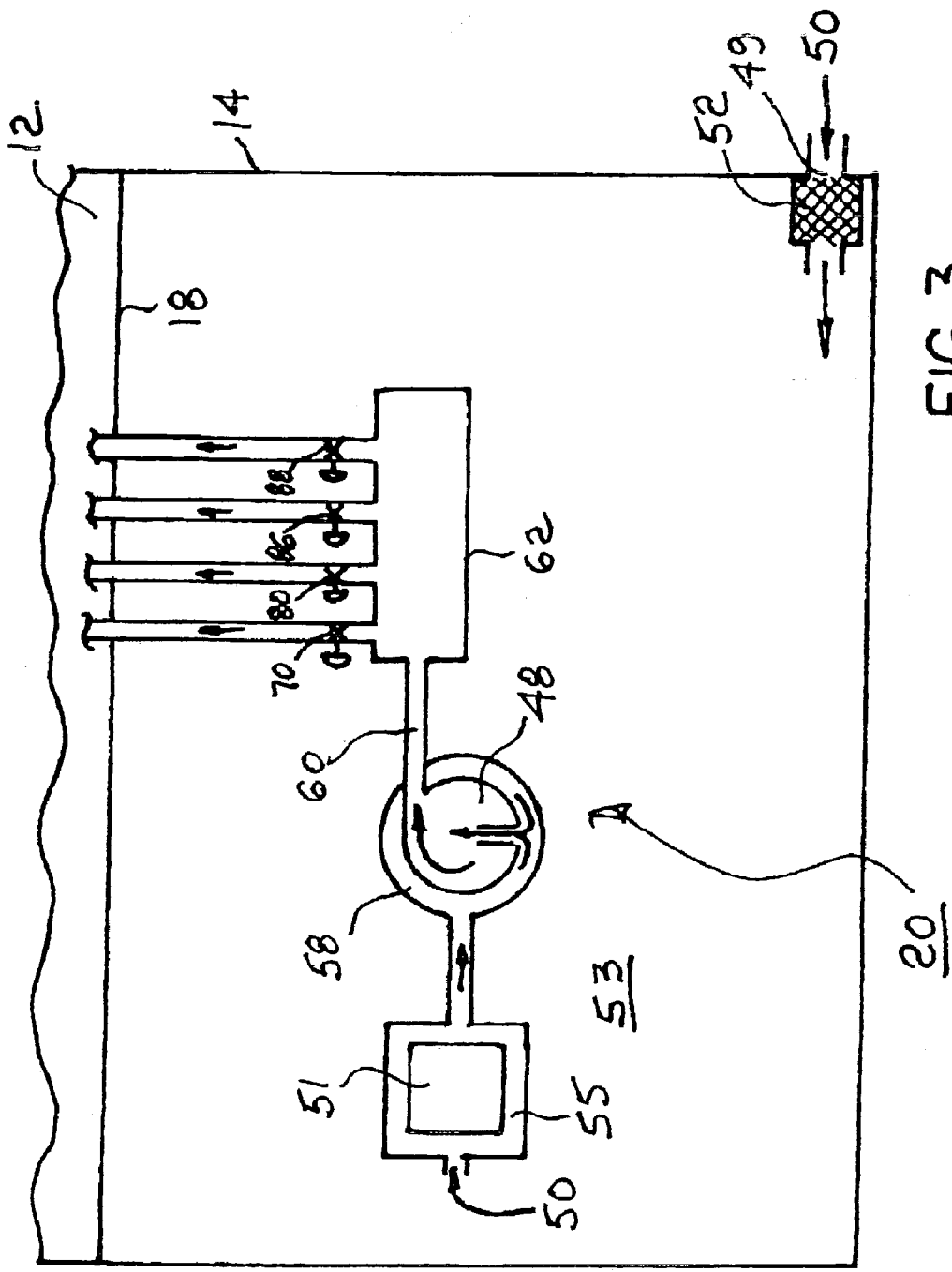
FIG. 3 is a schematic drawing of a prior art PSM air supply system.

Referring now to FIGS. 2 and 3 herein, in a prior art air supply and control assembly 20, a conventional high speed air blower 48 draws inlet air 50 through an air filter 52 (FIG. 1) and a port 49 in a wall of enclosure 14 into the interior 53 of enclosure 14. Inlet air 50 is then drawn past electronic controls 51 via cooling jacket 55, past a first MAF sensor 54, through a sonic silencer 56, and through a cooling shroud 58 surrounding blower 48. Air discharge 60 from blower 48 is fed into a plenum 62 for supplying a plurality of independent fuel cell functions. Combustor cooling air 64 is metered via a second MAF sensor 68 and a combustor cool air control valve 70. Anode air feed 74 goes to a hydrocarbon fuel vaporizer 77 (FIG. 1) via a third MAF sensor 78 and reformer air control valve 80. Cathode air feed 75 is controlled by cathode air control valve 86 and may be controllably diverted by cathode air preheat bypass valve 88. The air control valves are controllably operated by electronic controls 51.

Figure 4:
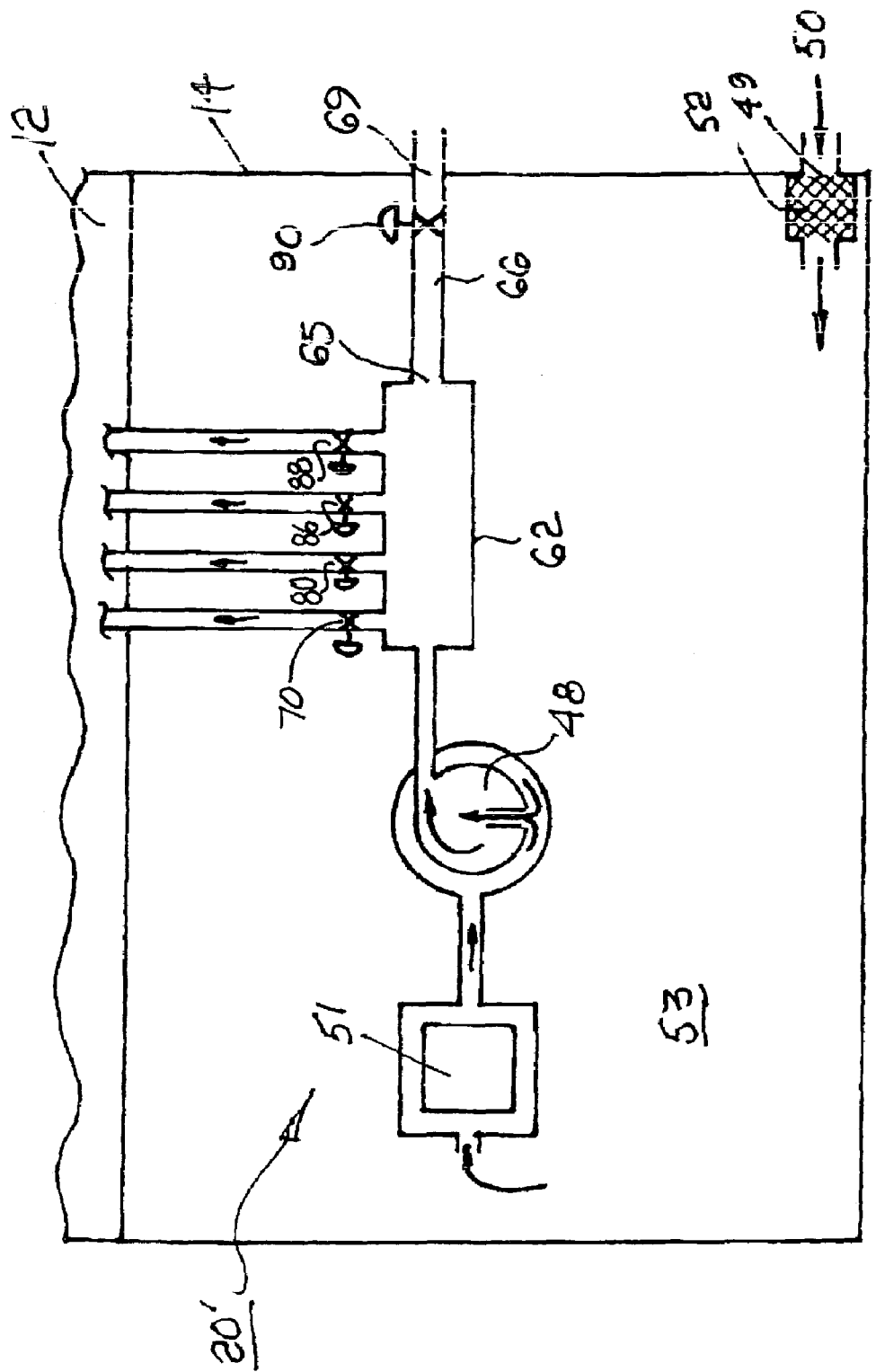
FIG. 4 is a schematic drawing of a PSM air supply system in accordance with the invention.

Referring to FIG. 4, an air supply and control system 20' in accordance with the invention preferably includes all the elements of prior art system 20 as shown in FIG. 3. However, plenum 62 is provided with an additional port 65 connected via passage 66 to an additional discharge port 69 through a wall 72 of structural enclosure 14. Port 65 is further provided with an additional control valve 90 controllably operated by electronic controls 51. Thus, as desired, for example during periods of shut-down or cool-down, valves 70,80,86,88 may be closed, valve 90 opened, and blower 48 energized to purge fresh air into interior 20 53, through system 20', and out port 69 to the exterior 93 of enclosure 14.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An air supply and control system for a fuel cell assembly, said system being disposed in an enclosure and being adapted to draw air from an exterior of said enclosure into an interior of said enclosure, said system comprising:
    a) a blower for drawing air from the interior of said enclosure and providing an air discharge;
    b) a controllable purge valve connected to a discharge passage from said blower and a discharge port formed in a wall of said enclosure for controllably directing said air discharge from said blower to said exterior of said enclosure to purge gases from said enclosure interior to said enclosure exterior; and
    c) at least one process air valve disposed downstream of said blower and in parallel with said purge valve.

2. A system in accordance with claim 1 wherein said process air valve is controllable of an individual air flow to a fuel cell process function, said fuel cell process function including at least one of combustor cooling air, anode feed air, cathode feed air, or cathode preheat bypass air.

3. A system in accordance with claim 1 wherein said process air valve is closed and said purge valve is opened to effect said purge of gases from said enclosure interior.

4. A method for purging gases from an enclosure for a fuel cell air supply system, comprising the steps of:
    a) providing a blower for drawing air from the interior of said enclosure and providing an air discharge to a process air valve and a purge valve; and
    b) closing said process air valve and opening said purge valve to controllably direct said air discharge from said blower to an exterior of said enclosure to purge gases from said enclosure interior to said enclosure exterior.

5. A fuel cell system comprising an air supply system disposed in an enclosure, said air supply system including
    a blower for drawing air from the interior of said enclosure and providing an air discharge,
    a controllable purge valve connected to a discharge passage from said blower and a discharge port formed in a wall of said enclosure for controllably directing said air discharge from said blower to an exterior of said enclosure to purge gases from said enclosure interior to said enclosure exterior; and
    c) at least one process air valve disposed downstream of said blower and in parallel with said purge valve.

6. An air supply and control system for a fuel cell assembly, said system being disposed in an enclosure and being adapted to draw air from an exterior of said enclosure into an interior of said enclosure, said system comprising:
    a) a blower for drawing air from the interior of said enclosure and providing an air discharge;
    b) at least one process air valve controllable of an individual air flow to a fuel cell process function, said fuel cell process function including at least one of combustor cooling air, anode feed air, cathode feed air, or cathode preheat bypass air; and
    c) a controllable purge valve disposed in parallel with said at least one process air valve, said purge valve connected to a discharge passage from said blower and a discharge port formed in a wall of said enclosure for controllably directing said air discharge from said blower to said exterior of said enclosure to purge gases from said enclosure interior to said enclosure exterior.

* * * * *